United States Patent [19]
Nagano

[11] Patent Number: 4,592,738
[45] Date of Patent: Jun. 3, 1986

[54] CHAIN GEAR FOR A BICYCLE
[75] Inventor: Masashi Nagano, Izumi, Japan
[73] Assignee: Shimano Industrial Company Limited, Osaka, Japan
[21] Appl. No.: 633,440
[22] Filed: Jul. 23, 1984
[30] Foreign Application Priority Data
Jul. 22, 1983 [JP] Japan .................................. 58-134921
[51] Int. Cl.⁴ ............................................. F16H 11/08
[52] U.S. Cl. ........................................ 474/80; 474/162
[58] Field of Search ..................................... 474/78–80, 474/160, 162; 280/236

[56] References Cited
U.S. PATENT DOCUMENTS
1,431,374  10/1922  Cullman ........................... 474/162 X
3,106,101  10/1963  Harriman ......................... 474/162 X Primary Examiner—Stephen J. Novosad
Assistant Examiner—Thuy M. Bui
Attorney, Agent, or Firm—Stevens, Davis, Miller & Mosher

[57] ABSTRACT

A multi-state bicycle chain gear assembly includes a chain gear which has a gear body having a plurality of teeth and at least one partial gear also having a plurality of teeth. The partial gear is connected to the gear body such that it is shiftable axially relative to the multi-stage chain gear assembly. The partial gear and the gear body form a complete chain gear wherein each tooth is positioned within a single plane. The partial gear is connected to the gear body such that when the partial gear and the gear body are driven to rotate as a complete chain gear, the partial gear is shifted less at its front side defined relative to the drive rotation direction of the complete chain gear than at the rear side of the partial gear defined relative to this same rotation direction.

2 Claims, 6 Drawing Figures

CHAIN GEAR FOR A BICYCLE

FIELD OF THE INVENTION

The invention relates to a chain gear for a bicycle and more particularly to a chain gear for a bicycle, which forms a multi-stage chain gear assembly and constitutes in association with a derailleur a speed-change device for a bicycle.

BACKGROUND OF THE INVENTION

Conventionally, each chain gear forming a multi-stage chain gear assembly comprises merely a single gear body having a number of teeth, and a driving chain is moved forcibly axially of the chain gears by operation of the derailleur to switch the chain from one of the plurality of chain gears to any other chain gear, thereby making a speed-change. In this instance, it is necessary to forcibly disengage the chain from a corresponding chain gear in mesh therewith by operation of the derailleur because each chain gear is formed with merely a single gear body. Hence, such device provides poor speed-change efficiency.

Meanwhile, a shifting device has been proposed as shown in U.S. Pat. No. 4,127,038 in which the gear body is formed of a pair of gear sectors each having a partial gear, and each gear sector is swingable, so that a partial gear of one gear sectors is moved to allow the teeth at its associated partial gear to be positioned within a plane of the teeth at a partial gear of the other gear sector to thereby switch the chain.

But, the shifting device does not employ a derailleur but instead adapts the gear sectors to be moved so that the shifting device requires a special movement mechanism for moving the gear sectors, and it is necessary to set the partial gear of each sectors to come within a plane of the partial gear of the other gear sector. Additionally, it is necessary to correspond the pitch of the teeth at each partial gear with the chain pitch of the driving chain due to the fact that the shifted chain in mesh with the partial gear upon its movement needs to be surely engaged with the other partial gear. As a result, this shifting device as a whole is complex in construction, troublesome in machining, and expensive to produce. Thus, this shifting device cannot basically solve the aforesaid problem of the conventional shifting device employing the derailleur.

SUMMARY OF THE INVENTION

The invention has been designed to overcome the above problems. An object of the invention is to provide a chain gear which comprises a gear body having a number of teeth, and at least one partial gear having a plurality of teeth. The partial gear is adapted to be shiftable axially of a multi-stage chain gear assembly so that the partial gear is shifted when the chain in mesh with the partial gear is pushed out axially of the chain gear by the derailleur. The chain can be kept in mesh with the teeth of the partial gear without disengaging therefrom during the shifting operation of the partial gear, and then switched to the other chain gear with the chain being kept in mesh with the teeth of the partial gear, thereby giving always a sure speed-change efficiency.

The invention is characterized in that the chain gear is provided with a gear body having a number of teeth and at least one partial gear having a plurality of teeth. The partial gear is supported to the gear body such that it is shiftable axially of the multi-stage chain gear assembly with respect to the gear body, so that the partial gear together with the gear body constitute a complete chain gear wherein the teeth at the partial gear and gear body are laid within a same plane. The partial gear is so supported to the gear body that the partial gear, when it rotates together with the gear body as the aforesaid complete chain gear, is less shifted at the front side of the partial gear in the drive rotation direction of the complete chain gear in comparison with the rear side of the partial gear in the same rotation direction.

The particular characteristic of the invention is that upon switching the chain, the partial gear is shifted axially of the chain gear by use of the derailleur's biasing of the chain in mesh with the partial gear in the axial direction of the chain gear so as to allow the chain to travel toward the other chain gear with the chain being kept in mesh with the partial gear, so that the chain which is kept in mesh with the partial gear can be switched to that other chain gear. Hence, the invention can provide always a smooth switching of the chain and a facilitated speed-change efficiency in comparison with the conventional shifting device employing a chain gear formed of a single construction and a derailleur.

Additionally, according to the invention the partial gear is shifted by operation of the derailleur's biasing of the chain axially of the chain gear, so that the invention does not require a particular movement mechanism for the partial gear and it is enough that the partial gear is merely shifted a small distance. In other words, the partial gear to be shifted does not need to be shifted as the conventional shifting device for enough to be within a plane of the chain gear to which the chain is switched. Also, it is unnecessary that either the teeth at the partial gear when shifted to shift and switch the chain kept in mesh therewith to the other chain gear, or the teeth at this other chain gear to be meshed with the chain, correspond in their tooth pitch with the chain pitch of the chain. Thus, the chain gear can be simple in construction and does not lead to a considerable larger cost to produce in comparison with the conventional chain gear formed of a single construction.

Additionally, the partial gear is so supported to the gear body that the partial gear when it rotates together with the gear body as a complete chain gear is less shifted at the front side of partial gear in the drive rotation direction of the complete chain gear in comparison with the rear side of partial gear in the same rotation direction, so that the chain can be smoothly switched as aforesaid. And, it is enough that the rear side of the partial gear in the drive rotation direction is merely moved away from the gear body, so that the rear side of the partial gear does not need a specific accuracy of continuation or interconnection with the gear body. Furthermore, the partial gear is less shifted at the front side as aforesaid, so that the chain is in mesh with teeth at the gear body, and then sequentially smoothly and accurately becomes meshed with the teeth of the partial gears when shifted.

In the invention, the partial gear is pivotally connected to the gear body mainly by use of a hinge. Alternatively, the partial gear may be formed integrally with the gear body to be shiftable as a result of a material forming the gear body.

These and other objects of the invention will be made more apparent from the following description according to the attached drawings.

DETAILED DESCRIPTION OF THE INVENTION

Figure 1:
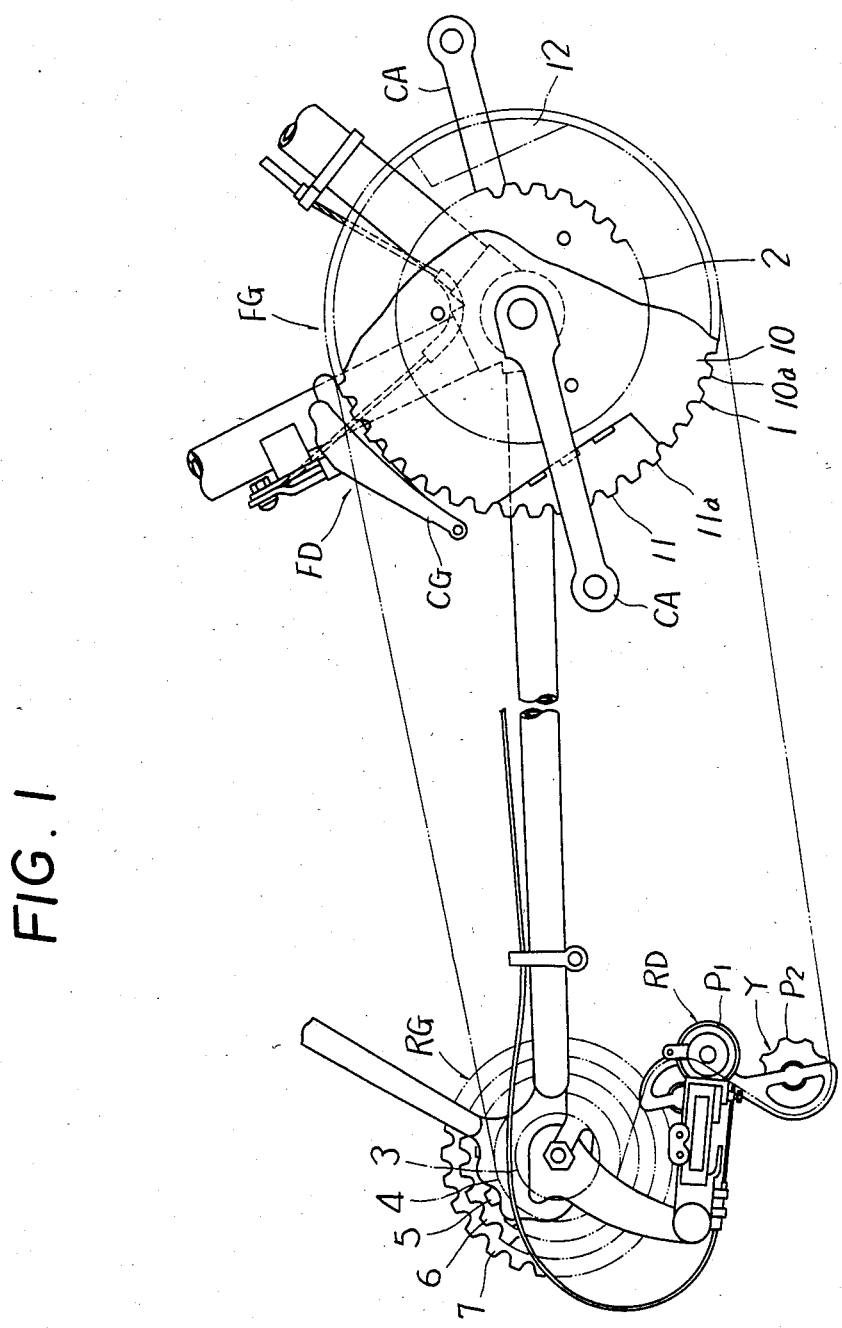
FIG. 1 is a front view of the whole of a speed-change device for a bicycle to which a chain gear of the invention is applied.

FIG. 1 shows a speed-change device for a bicycle wherein the invention is applied to a front multi-stage chain gear assembly FG. The chain gear assembly FG comprises a larger diameter chain gear 1 and a smaller diameter chain gear 2. A rear multi-stage chain gear assembly RG comprises five chain gears 3 through 7 having different numbers of teeth respectively. A driving chain C is supported between the front and rear chain gear assemblys FG and RG. A front derailleur FD is mounted to the front chain gear assembly FG and correspondingly a rear derailleur RD to the rear chain gear assembly RG, so that a ten-stage speed change can be performed by use of a combination of each chain gears 1, 2, and 3 through 7 at the chain gear assemblys FG and RG.

The front derailleur FD is as known provided with a chain guide CG which is moved axially of the front multi-stage chain gear assembly FG, so that the chain guide CG is operated to move axially of the chain gears to thereby switch the chain C to one of the chain gears 1, 2.

The rear derailleur RD is provided with a changeover frame Y having a pair of pulleys $P_1$, $P_2$, so that the changeover frame Y is operated to move axially of the rear multi-stage chain gear assembly RG to thereby switch the chain C to one of the chain gears 3 through 7.

Figure 2:
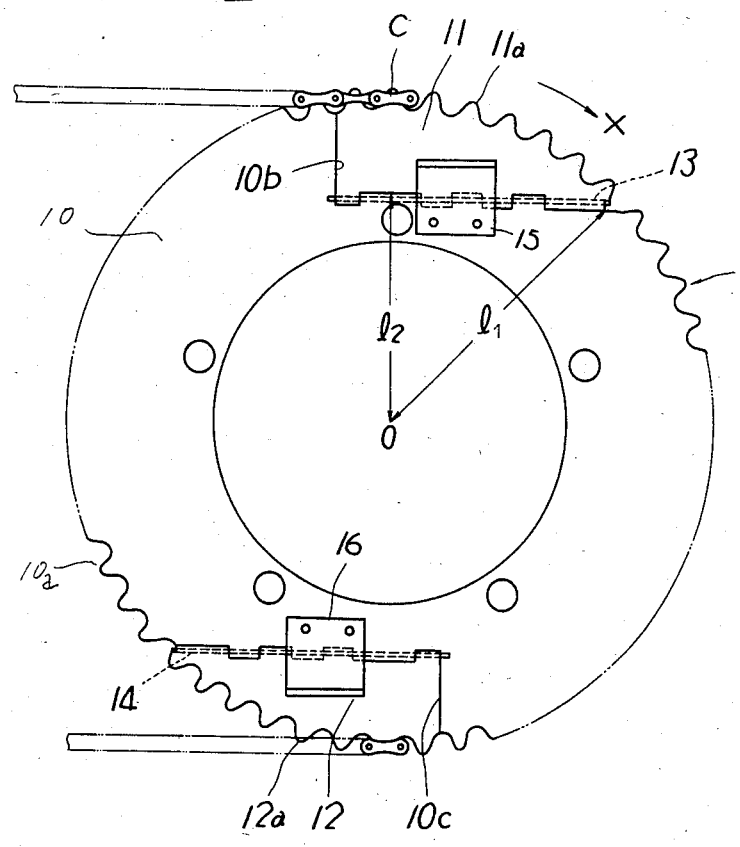
FIG. 2 is a front view of a first embodiment of the chain gear.
Figure 3:
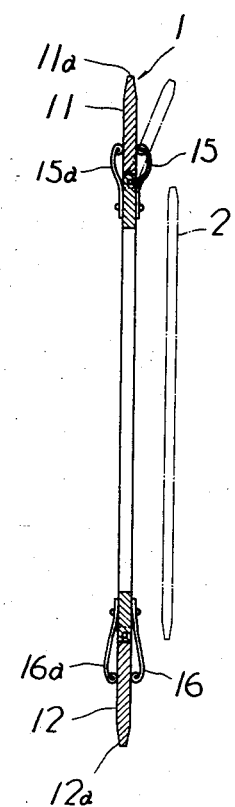
FIG. 3 is a central longitudinal sectional view.
Figure 4:
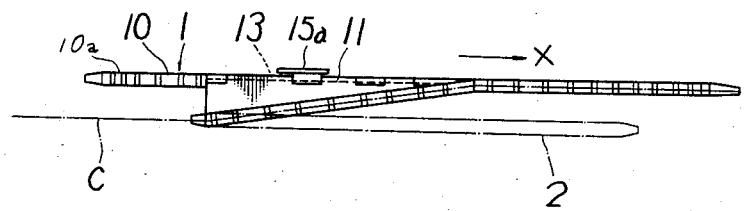
FIG. 4 is a plan view showing a condition in which the partial gear is being shifted.

Next, an embodiment of the chain gear applied to the above-described speed-change device constructed as abovesaid will be detailed according to FIGS. 2 through 4.

FIGS. 2 through 4 show a larger diameter chain gear 1 constituting a front multi-stage chain gear assembly FG. The chain gear 1 comprises as shown in FIG. 2 a gear body 10 having a number of teeth 10a, and two partial gears 11, 12 each having a plurality of teeth 11a, 12a.

The gear body 10 is provided with cut-out portions 10b, 10c to which the partial gears 11, 12 are swingably pivotted through a hinge 13, 14, so that the partial gears 11, 12 can be shifted toward a smaller diameter chain gear 2 with respect to the gear body 10. The smaller diameter chain gear 2 together with the larger diameter chain gear constitute the multi-stage chain gear assembly FG.

Each partial gear 11, 12 is usually positioned at a neutral position by means of an elastic means 15, 16 which is formed mainly of a pair of leaf spring as shown in FIGS. 2, 3. In other words, the teeth at each partial gear 11, 12 are positioned within the same plane as that of the teeth of gear body 10 so as to form a complete chain gear.

Each partial gear 11, 12 when it rotates as the complete chain gear is less shifted at the front side of the partial gears in the drive rotation direction (Arrow X direction in FIG. 2) of the complete chain gear in comparison with the degree of shifting which occurs at the rear side of the partial gears in this rotation direction. Also, each partial gear 11, 12 is so shifted at its rear side in that rotation direction as shown in FIGS. 3, 4 that the rear side of each partial gear comes to or near the chain line of the smaller diameter chain gear 2. In other words, the outer peripheral face of each partial gear 11, 12 is so arranged that the pitch diameter of teeth 11a, 12a of the partial gears 11, 12 when assembled with the gear body 10 corresponds to the pitch diameter of teeth 10a at the gear body 10.

Additionally, an interval between the rotation center 0 of the gear body 10 and the bottom of each partial gear increases gradually from the rear side of the partial gears to the front side thereof in the drive rotation direction of the chain gear, so that an interval $l_1$ between the center 0 and the front end of the bottom of the partial gears is maximum and corresponds to a radius between the tooth bottom and the center of the chain gear 1, and an interval $l_2$ defined by a straight parpendicular from the center 0 to the bottom of the partial gears is minimum. Hence, an interval between the front end of the bottom of partial gears and the outer periphery of chain gear 1 is substantially zero, while an interval between the rear end of the bottom of the partial gears and the outer periphery of chain gear 1 is made longer, and the partial gears have at the rear end a rear face.

The partial gears 11, 12 are provided symmetrically with respect to the center of gear body 10 as shown in FIG. 2. The gear body 10 is so mounted to the crank as shown in FIG. 1 that the partial gears 11, 12 correspond to each crank arm CA. This arrangement is made according to the following facts. That is, when the chain C is switched by operation of front derailleur FD, the crank arm CA is driven to run the chain C as shown in FIG. 1. The torque transmitted to the crank arm CA by the cyclist's foot upon pedalling becomes minimum when the crank arm CA is positioned near the upper dead point, and the torque applied to the chain C becomes minimum, so that the chain C can be moved axially of the chain gear under a minimum resistance thereby to facilitate further the speed-change efficiency.

Next, operation of speed-change by the front multi-stage chain gear assembly FG shown in FIG. 1 employing the chain gear 1 constructed as abovesaid will be detailed.

To switch the chain C from larger chain gear 1 to the smaller diameter chain gear 2, the front derailleur FD is first operated to urge the chain guide CG toward the smaller diameter chain gear 2. In this instance, while one of the partial gears 11, 12 comes to the engagement position with the chain as shown in FIG. 2, the pressing force for the chain guide CG shifts the partial gear 11 or 12 toward the smaller diameter chain gear 2 against the elastic means 15 or 16 and pivoting around the hinge 13 or 14, as shown in FIGS. 3, 4. In this instance, the chain C, which is kept in mesh with the partial gears 11 or 12, is shifted together therewith to come to a position corresponding to the chain line of smaller diameter chain gear 2, so that the shifted chain C in mesh with the partial gear 11 or 12 does not come to be in mesh with the teeth 10a on the sequential gear body 10 and instead is shifted toward the smaller diameter chain gear 2 to become smoothly meshed with the teeth thereon.

As seen from the above, upon switching the chain C, the partial gear 11 or 12 is shifted at their rear side in the drive rotation direction of the chain gear to be moved away from the teeth 10a of gear body 10 and come to or near the chain line of smaller diameter chain gear 2. Hence, the chain C when shifted is kept in mesh with the teeth of partial gear 11 or 12 and switched to the smaller diameter chain gear 2, so that the chain can be always smoothly switched. And, when there is not given a specific well-facilitated accuracy in a continuation or interconnection between the teeth 10a of gear body 10 and the teeth on each partial gear 11, 12 at its rear side in the drive rotation direction of the chain gear, the speed-change efficiency is not affected. Additionally, since each partial gear is less shifted at its front side in the drive rotation direction, the chain C is in mesh with the teeth of gear body 10, then sequentially smoothly and accurately becomes meshed with the teeth of partial gears 11 or 12.

In the abovesaid construction, in case the chain C is switched from the smaller diameter chain gear 2 to the larger diameter chain gear 1, the front derailleur FD is operated, similarly to as like the aforesaid operation, to urge the chain C toward the larger diameter chain gear 1. In this instance, when one of the partial gears 11, 12 comes to meet the urged portion of the chain urged as abovesaid, the urging force for the chain C shifts the partial gear 11 or 12 oppositely to the smaller chain gear 2 against the eleastic means 15 or 16 and around the hinge 13 or 14. As a result, the chain C is moved toward the chain line of the larger diameter chain gear 1, so that the chain C can smoothly become meshed with sequential teeth 10a of gear body 10 at the larger diameter chain gear 1.

The invention may be applied also to the smaller diameter chain gear 2 at the front chain gear assembly FG other than the larger chain gear 1. Such arrangement can improve and facilitate the switching of the chain from the smaller chain gear 2 to the larger chain gear 1.

Furthermore, the invention can be applied to the rear multi-stage chain gear assembly RG, or the front chain gear assembly FG employing three or more than three chain gears.

Addtionally, the chain gear may employ only one partial gear other than the two partial gears 11, 12 as shown in FIG. 2, or may employ three or more than three partial gears.

The elastic means 15, 16 for usually holding each partial gears 11, 12 at its neutral position is not indispensable.

Figure 5:
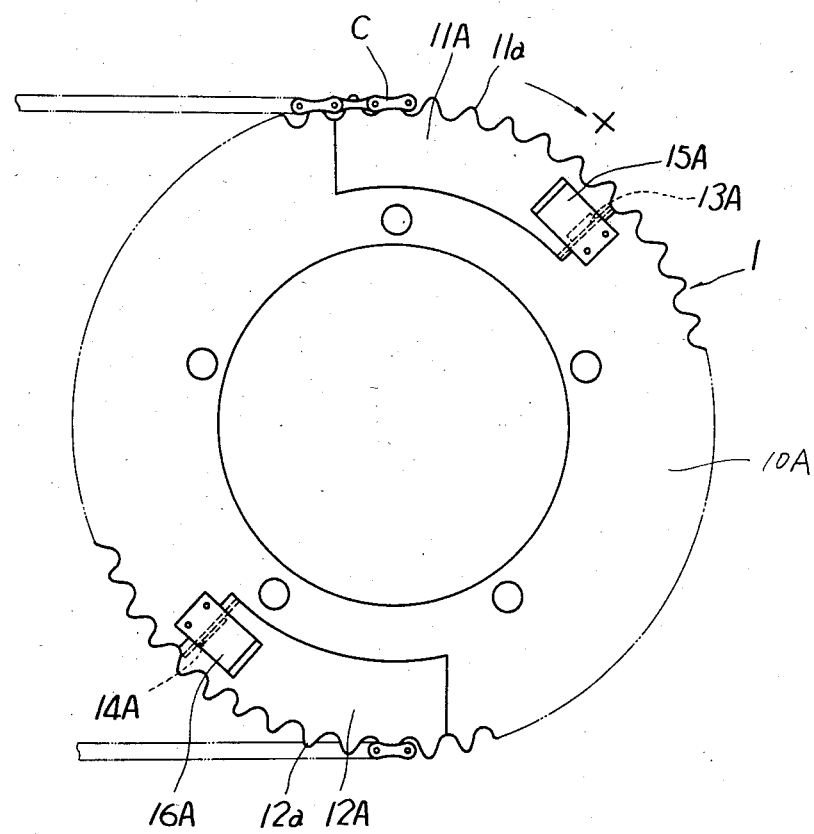
FIGS. 5 and 6 are front views corresponding to FIG. 2, and FIGS. 5, 6 show second and third embodiments respectively of the chain gear.

In the embodiment shown in FIGS. 2 through 4 the partial gears 11, 12 are connected to the gear body 10 such that each partial gear 11, 12 is formed in substantially a triangular shape, and the bottom portion of each partial gear is pivoted to the gear body 10 alternatively, the partial gears 11A, 12A may be formed in a partial circular shape as shown in FIG. 5, and the partial gears may be pivoted, at their side face portion at the front side of partial gears in the rotation direction of the chain gear, to the gear body 10A through a hinge 13A, 14A. In this case, it is preferable to employ an elastic means 15A, 16A as in the first embodiment.

Figure 6:
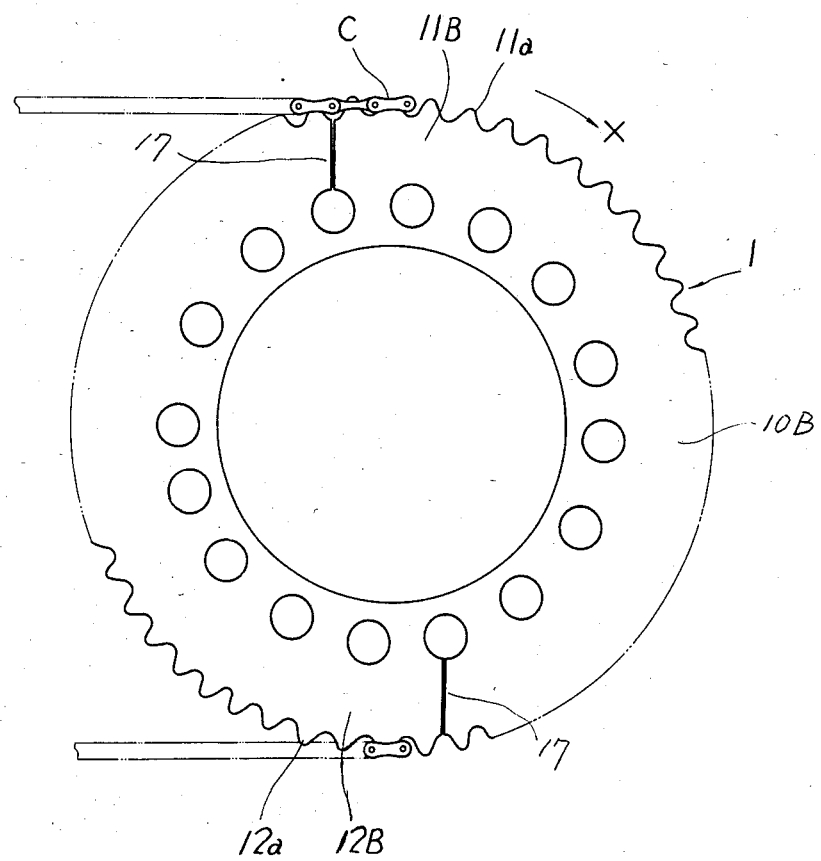

In each abovesaid embodiment, the gear body 10, 10A is formed separately from the partial gears 11, 11A, and 12, 12A and connected therewith by use of hinges 13, 13A, and 14, 14A respectively. Alternatively, as shown in FIG. 6, the gear body 10B and the partial gears 11B, 12B may be formed of a single elastic plate in which at one, two, or more than two points are provided a cut-into or slit portion 17 extending radially inwardly from the outer periphery of the chain gear to thereby form the partial gears 11B, 12B which can be shiftable due to elasticity of the elastic plate.

In the invention, the partial gears 11, 11A, 11B, and 12, 12A, 12B not need be shifted such that the teeth 11a or 12a of the partial gears come to be within the same plane as the teeth 12a or 11a of the other partial gears.

Several specific embodiments of the invention have been referred to. The invention should not be limited thereto but is limited only to the scope of right referred to in the attached claims.

What is claimed is:

1. A chain gear for a bicycle which includes a derailleur for shifting a driving chain from one gear to another of a multi-stage chain gear assembly, said chain gear comprising a gear body having a plurality of teeth, at least one partial gear having a plurality of teeth, and hinge means disposed between said partial gear and said body for pivotably connecting said partial gear with respect to said gear body such that said partial gear is shiftable axially relative to said multi-stage chain gear assembly, said partial gear and said gear body together forming a complete chain gear in which said teeth of said partial gear and said gear body are disposed in a same plane, said partial gear being connected to said gear body such that said partial gear when rotating as a complete chain gear with said gear body is shifted less at a front side of said partial gear defined relative to a drive rotation direction of the complete chain gear than at a rear side of said partial gear defined relative to said drive rotation direction, said gear body including elastic means for positioning said partial gear in a neutral position in a same plane as said gear body, said partial gear being caused to shift axially, responsive to said derailleur contacting said chain to move said chain axially of said multi-stage chain gear assembly, to thereby cause the chain which is in engagement with the partial gear to be switched to another chain gear of the multi-stage chain gear assembly while maintaining the engagement of the chain with the partial gear.

2. A chain gear for a bicycle according to claim 1, wherein a single elastic plate comprises said gear body and said partial gear, said elastic plate including a slit which separates a rear side of said partial gear from said gear body.

* * * * *